US012410895B2

(12) United States Patent
Van Meel et al.

(10) Patent No.: US 12,410,895 B2
(45) Date of Patent: Sep. 9, 2025

(54) LUMINAIRE ARRANGEMENT AND METHOD FOR ASSEMBLING SUCH LUMINAIRE ARRANGEMENT

(71) Applicant: SIGNIFY HOLDING B.V., Eindhoven (NL)

(72) Inventors: Marcus Cornelis Van Meel, Helmond (NL); Peter Johannes Martinus Bukkems, Deurne (NL); Erik Paul Boonekamp, Bunnik (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/837,903

(22) PCT Filed: Feb. 22, 2023

(86) PCT No.: PCT/EP2023/054359

§ 371 (c)(1),
(2) Date: Aug. 13, 2024

(87) PCT Pub. No.: WO2023/169820

PCT Pub. Date: Sep. 14, 2023

(65) Prior Publication Data

US 2025/0146633 A1 May 8, 2025

(30) Foreign Application Priority Data

Mar. 7, 2022 (EP) .................................... 22160465

(51) Int. Cl.
*F21S 4/28* (2016.01)

(52) U.S. Cl.
CPC ....................................... *F21S 4/28* (2016.01)

(58) Field of Classification Search
CPC ......................................................... F21S 4/28

(Continued)

(56) References Cited

U.S. PATENT DOCUMENTS

| | | | | |
|---|---|---|---|---|
| 10,344,945 | B2 * | 7/2019 | Hoch | F21V 23/009 |
| 2015/0167902 | A1 | 6/2015 | Rodgers et al. | |
| 2018/0195673 | A1 | 7/2018 | Goelz et al. | |

FOREIGN PATENT DOCUMENTS

| | | | |
|---|---|---|---|
| WO | 2013030814 | A2 | 3/2013 |
| WO | 2013030814 | A3 | 5/2013 |

* cited by examiner

*Primary Examiner* — James R Greece
*Assistant Examiner* — Hana S Featherly

(57) ABSTRACT

A luminaire arrangement (100), comprising, a housing (110) extending in a length direction, L, at least one printed circuit board, PCB (120), arranged inside the housing, wherein the at least one PCB extends in the length direction, L, at least one light source (130) arranged on the at least one PCB, at least one supporting element (140) arranged on the at least one PCB, and adjacent to the at least one light source, at least one biasing element (150) extending in the length direction, L, where the at least one biasing element is arranged between the at least one supporting element and the housing and is configured to be biased between the at least one supporting element and the housing in a direction, B, perpendicular to the length direction, L, wherein the at least one supporting element extends beyond the at least one light source in the direction, B, by at least a distance, D, such that the at least one light source and the at least one biasing element are separated by at least the distance, D, and at least one fastening element (160) extending in the length direction, L, wherein the at least one fastening element is arranged at least partially within the housing and is biased between the at least one biasing element and the housing, and wherein the at least one fastening element is configured to fasten the at least one biasing element between the at least one supporting element and the housing wherein the at least one fastening element comprises at least one optical element which has an elongated cylindrical shape.

13 Claims, 7 Drawing Sheets

(58) Field of Classification Search
USPC ..................................................... 362/217.01
See application file for complete search history.

LUMINAIRE ARRANGEMENT AND METHOD FOR ASSEMBLING SUCH LUMINAIRE ARRANGEMENT

CROSS-REFERENCE TO PRIOR APPLICATIONS

This application is the U.S. National Phase application under 35 U.S.C. § 371 of International Application No. PCT/EP2023/054359, filed on Feb. 22, 2023, which claims the benefit of European Patent Application No. 22160465.5, filed on Mar. 7, 2022. These applications are hereby incorporated by reference herein.

FIELD OF THE INVENTION

The present invention generally relates to a luminaire arrangement. More specifically, the present invention is related to a luminaire arrangement and a method for assembling such luminaire arrangement.

BACKGROUND OF THE INVENTION

Light fixtures for distribution of light come in various different configurations, designs, and styles. The assembly of a light fixture therefore varies widely. It is common that light fixtures require handling by care, as light fixtures may be fragile and may comprise sensitive components such as a light sources, electrical wirings, electronic elements, etc.

One trend is to have light fixtures with extrusion profiles. This structure provides a safer way when handling the light fixture due to the protective housing which the extrusion profiles constitute. In addition to this, light fixtures with extrusion profiles may present a finished and aesthetically attractive appearance.

When handling elongated light fixtures, for example tube lights, common approaches for assembling these light fixtures may comprise clicking or forging the components thereof together. If the elongated light fixture comprises an extrusion profile, sliding is also a common approach for assembly. Clicking or forging the components in place may require large forces, thus increasing the risk of damaging sensitive components within the light fixture. Sliding the components in place can therefore be considered a safer procedure, as it seldom requires large forces. On the other hand, to assemble components by a sliding movement requires a greater workspace than clicking or forging, as components may have to be arranged after each other in a row to enable the sliding movement.

It may be preferable to have a relatively compact light fixture in regard to desired aesthetics and to facilitate assembling and handling of the light fixture. If the components of the compact light fixture exceed a certain length, the required amount of force for assembling the components by sliding may become too great to conveniently be assembled by a person. Assembling of such light fixtures may also encounter difficulties regarding fixation of the (elongated) extrusion profiles, especially when handling multiple extrusion profiles.

Hence, it is of interest to provide alternatives to the light fixtures of the prior art in order to improve the assembly of such light fixtures in regard to safety of their components, and space-efficiency.

WO2013030814A2 discloses a luminare having LEDs and supports mounted on a substrate, the supports retaining a reflector separated from the substrate.

SUMMARY OF THE INVENTION

It is an object of the present invention to provide a compact and resilient luminaire arrangement with a decreased risk of damaging the components of the luminaire arrangement during assembly.

This and other objects are achieved by providing a luminaire arrangement and a method assembling such luminaire arrangement having the features in the independent claims. Preferred embodiments are defined in the dependent claims.

Hence, according to a first aspect of the present invention, there is provided a luminaire arrangement for a luminaire. The luminaire arrangement comprises a housing extending in a length direction, L, at least one printed circuit board, PCB, arranged inside the housing, wherein the at least one PCB extends in the length direction, L, at least one light source arranged on the at least one PCB and at least one supporting element arranged on the at least one PCB, and adjacent to the at least one light source. The luminaire arrangement further comprises at least one biasing element extending in the length direction, L, wherein the at least one biasing element is arranged between the at least one supporting element and the housing and is configured to be biased between the at least one supporting element and the housing in a direction, B, perpendicular to the length direction, L. The at least one supporting element extends beyond the at least one light source in the direction, B, by at least a distance, D, such that the at least one light source and the at least one biasing element are separated by at least the distance, D. The luminaire arrangement further comprises at least one fastening element extending in the length direction, L, wherein the at least one fastening element is arranged at least partially within the housing and is biased between the at least one biasing element and the housing, and wherein the at least one fastening element is configured to fasten the at least one biasing element between the at least one supporting element and the housing.

According to a second aspect of the present invention, there is provided a method for assembling a luminaire arrangement, wherein the luminaire arrangement comprises a housing extending in a length direction, L, at least one printed circuit board, PCB, arranged inside the housing, wherein the at least one PCB extends in the length direction, L, at least one light source arranged on the at least one PCB, at least one supporting element arranged on the at least one PCB, and adjacent to the at least one light source, at least one biasing element and at least one fastening element. The method comprises biasingly inserting the at least one biasing element in a direction, B, perpendicular to the length direction, L, between the at least one supporting element and the housing, wherein the inserted at least one biasing element extends in the length direction, L, and the at least one supporting element extends beyond the at least one light source in the direction, B, by at least a distance, D, such that the at least one light source and the at least one biasing element are separated by at least the distance, D. The method further comprises biasingly inserting the at least one fastening element into the housing between the at least one biasing element and the housing, such that the biasing element is fastened between the at least one supporting element and the housing, wherein the inserted at least one fastening element extends in the length direction, L.

Thus, the first and second aspects of the present invention are based on the common concept or idea of providing a luminaire arrangement or method for assembling a luminaire arrangement, without causing damage to sensitive components of the luminaire arrangement during its assembly. Hence, the first and second aspects of the present invention share a common general inventive concept of providing a luminaire arrangement or method for assembling a luminaire arrangement wherein (a) light source(s) in the luminaire arrangement may be protected from physical contact, and thus potential damage, from other components, by having supporting element(s) arranged nearby the light source(s).

It will be appreciated that the luminaire arrangement is conveniently assembled by a person and may only require relatively small forces when assembling the components of the luminaire arrangement. The luminaire arrangement is easily and conveniently assembled due to the biasing of the biasing element(s) is(are) between the supporting element(s) and the housing. Sequentially, the fastening element(s) is (are) biased between the biasing element(s) and the housing, wherein the fastening element(s) is (are) configured to fasten the biasing element(s) between the supporting element(s) and the housing. The biasing element(s) and the fastening element(s) ensure that the luminaire arrangement is fastened, without having to use large forces. The absence of the need to use large forces upon assembly of the luminaire arrangement decreases the risk of damaging sensitive components such as the light source(s) during assembly.

It will be further appreciated that the supporting element(s) ensures that the light source(s) and the biasing element(s) are separated by at least the distance, D. The supporting element(s) may ensure a distance, D, between the light source(s) and the biasing element(s) because the supporting element(s) extend(s) beyond the light source(s) in the direction, B, by at least a distance, D. Hence, the supporting element(s) prevents physical contact between the light source(s) and the biasing element(s) which otherwise may cause damage to the light source(s).

It will be further appreciated that the luminaire arrangement is relatively compact. The luminaire arrangement is compact because the biasing element(s) and the fastening element(s) may be arranged close to the light source(s), without risk of damaging the light source(s). Thus, the luminaire arrangement requires less space when installed compared to other arrangements in the prior art. Additionality, as the biasing element(s) and the fastening element(s) may be arranged closer to the light source(s), the luminaire arrangement provides an increased control over the beam of the light source(s). It also follows that undesirable light leakage is minimized due to the close arrangement of the biasing element(s) and the fastening element(s) to the light source(s). Furthermore, compared to prior art arrangements, the luminaire arrangement of the present invention may be easier handled during e.g., transportation and/or installation.

It should also be noted that the luminaire arrangement is fixated via biasing. Fixation via biasing saves space desired and/or required for assembly of the luminaire arrangement as the components may be arranged next to each other during assembly, compared to fixation via sliding which requires the components to be arranged after each other in a row to enable the sliding movement. In addition to this, fixation via biasing simplifies the assembly process compared to fixation via sliding, where the components of the latter may be difficult to keep in place during assembly.

The at least one biasing element is configured to be biased between the at least one supporting element and the housing. By the term "bias(ed)", it is here meant spanning and tightening, or the like. Hence, by "biasing element which is configured to be biased between the at least one supporting element and the housing", it is here meant that the biasing element(s) is spanned and tightened between the supporting element(s) and the housing.

The at least one fastening element is configured to fasten the at least one biasing element between the at least one supporting element and the housing. By the term "fasten", it is here meant, but not limited to, securing, fixating, holding and/or locking.

According to an embodiment of the present invention, the at least one biasing element may comprise a reflective surface on a side of the at least one biasing element facing the at least one fastening element. Hence, the reflective surface of the biasing element(s) may face the fastening element(s). The present embodiment is advantageous in that the beam of the light source(s) may be at least partially reflected, thus improving the distribution of the light from the light source(s). This enables a larger space to be illuminated, with a wider spread of the light from the light source(s). The present embodiment is further advantageous in that the beam of the light source(s) may be shaped corresponding to the extent of the reflective surface. This is advantageous in that the present embodiment may facilitate different lighting desires and/or needs, e.g., a provision of light to a specific area in a space where the luminaire arrangement resides.

According to an embodiment of the present invention, the at least one biasing element may be configured to be rotatably biased between the at least one supporting element and the housing around a rotational axis parallel to the length direction, L. In other words, the biasing element(s) may be biased between the supporting element(s) and the housing via rotation. The rotational axis of the rotation of the biasing element(s) is around a rotational axis which is parallel to the length direction, L. The present embodiment is particularly advantageous in that the luminaire arrangement requires less force by a person upon assembly. In addition to this, the present embodiment enables a more precise assembly. The present embodiment is hereby advantageous in that it results in an even further decrease of the risk of damaging sensitive components, e.g., the light source(s), of the luminaire arrangement.

According to an embodiment of the present invention, the rotational axis may be arranged at a contact region between the at least one PCB and the at least one supporting element. By "contact region", it is here meant an area wherein the PCB(s) and the supporting element(s) connect. The present embodiment is advantageous in that the biasing element(s) can be arranged closer to the light source(s), without an increased risk of damaging sensitive components. This is beneficial in that the distribution of the beam from the light source(s) may be more accurate and precise.

According to an embodiment of the present invention, the at least one light source may have a width, $W_{LS}$, in the direction, B, and a height, $H_{LS}$, in a direction perpendicular to the length direction, L, and perpendicular to the direction, B, and wherein the at least one supporting element may have a width, $W_{SE}$, in the direction, B, and a height, $H_{SE}$, in a direction perpendicular to the length direction, L, and perpendicular to the direction, B, wherein at least one of $W_{SE}>W_{LS}$ and $H_{SE}>H_{LS}$ may be fulfilled. Hence, the light source(s) may have a width, $W_{LS}$, and a height, $H_{LS}$, and the supporting element(s) may have a width, $W_{SE}$, and a height, $H_{LS}$, wherein $W_{SE}>W_{LS}$ and/or $H_{SE}>H_{LS}$ is(are) satisfied. $W_{LS}$ and $W_{SE}$ extend in the direction, B, and $H_{LS}$ and $H_{SE}$ extend in a direction perpendicular to the length direction, L, and perpendicular to the direction, B. The present embodiment is particularly advantageous in that it further decreases the risk of damaging sensitive components, such as the light source(s).

According to an embodiment of the present invention, the at least one supporting element may comprise at least one of a resistor and a capacitor. The present embodiment is advantageous in that the use of resistor(s) and/or capacitor(s) as supporting element(s) may achieve an even more space-efficient luminaire arrangement when arranging components onto the surface(s) of the PCB(s).

According to an embodiment of the present invention, the at least one light source and the at least one supporting element may constitute an array extending in the length direction, L. By the term "array", it is here meant a (linear) arrangement, or the like. Hence, by the wording "the at least one light source and the at least one supporting element may constitute an array", it is here meant that the array of light source(s) and supporting element(s) may constitute a linear arrangement or chain of light source(s) and supporting element(s), or the like. The present embodiment is particularly advantageous in that it decreases the risk of damaging sensitive components, such as the light source(s). In addition to this, the present embodiment of the invention may achieve a more pleasant light experience for persons in a space wherein the luminaire arrangement is arranged.

According to an embodiment of the present invention, the luminaire arrangement may comprise at least two light sources arranged on the at least one PCB and wherein the at least one supporting element may be arranged between the at least two light sources. This embodiment is advantageous in that it may even further reduce the risk of damaging sensitive components, such as the light source(s), during e.g., assembly of the luminaire arrangement.

According to an embodiment of the present invention, at least one of the housing and the at least one biasing element may be flexible. By the term "flexible", it is here meant, but not limited to, bendable, adjustable and/or elastic. The present embodiment of the invention is particularly advantageous in that it requires less force by a person during assembly of the luminaire arrangement, thus facilitating the assembly. By requiring less force during assembly, the present embodiment results in a decreased risk of damaging sensitive components, such as the light source(s). Furthermore, the present embodiment enables a further fastening and accurate positioning of the fastening element(s). Alongside this, the present embodiment enables a further fastening of the biasing element(s). Each of these advantages is beneficial in that the distribution of the beam from the light source(s) may be more accurate and precise.

According to an embodiment of the present invention, the biasing element may comprise at least one recess and at least one foil, wherein the at least one foil may be arranged in the at least one recess. By the term "recess", it is here meant, but not limited to, slit, cavity, or indentation. By the term "foil", it is here meant, but not limited to, sheet or film. The present embodiment of the invention is advantageous in that it can further shape the light distribution of the light source(s) as a result of the position of the foil. This entails the present embodiment to be versatile regarding different lighting needs and/or desires e.g., providing light to a specific area. Moreover, the foil may further fixate the biasing element(s). This facilitates the assembly of the luminaire arrangement, as well as contributing to that the distribution of the beam from the light source(s) is more accurate and precise.

According to an embodiment of the present invention, at least one of the at least one fastening element, the at least one biasing element, and the housing may comprise an extrusion profile. Hence, the fastening element(s), the biasing element(s) and/or the housing may comprise an extrusion profile. By "extrusion profile", it is here meant a fixed and/or uniform cross-sectional profile or outline. The present embodiment is particularly advantageous in that the extrusion profile of the fastening element(s), the biasing element(s) and/or the housing result in a more aesthetically attractive luminaire arrangement. Furthermore, the present embodiment contributes to the mounting of the luminaire arrangement being more versatile, jointly with being more adaptable to different lighting needs and/or desires e.g., providing light to a specific area. In addition, the extrusion profile eases the assembly of the luminaire arrangement due to having a uniform cross-sectional profile.

According to an embodiment of the present invention, the at least one fastening element may comprise at least one optical element. By "optical element", it is here meant an element which may affect and/or influence light. More specifically, it may be an element which may act upon incoming light in such a manner that at least some light can pass through the element, such as a lens or a prism. The present embodiment is advantageous in that the optical element result in a more pleasant light experience for persons in a space wherein the luminaire arrangement is arranged. In addition to this, the optical element provides an increased control regarding the distribution and overall effect of the beam from the light source(s).

According to an embodiment of the present invention, the at least one optical element may have an elongated cylindrical shape. The present embodiment of the invention is advantageous in that the optical element(s) having an elongated cylindrical shape increases control over the impact and distribution of the beam of the light source(s). The present embodiment can moreover fulfill one or more lighting desires and/or needs, e.g., a provision of light to a specific area in a space where the luminaire arrangement resides.

According to an embodiment of the present invention, the at least one biasing element may comprise a curved surface and wherein the curved surface may be configured to abut the elongated cylindrical shape of the at least one optical element. The present embodiment of the invention is advantageous in that the curved surface may further fixate the optical element(s). This facilitates the assembly of the luminaire arrangement, as well as contributing to that the distribution of the beam from the light source(s) is more accurate and precise.

Further objectives of, features of, and advantages with, the present invention will become apparent when studying the following detailed disclosure, the drawings, and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
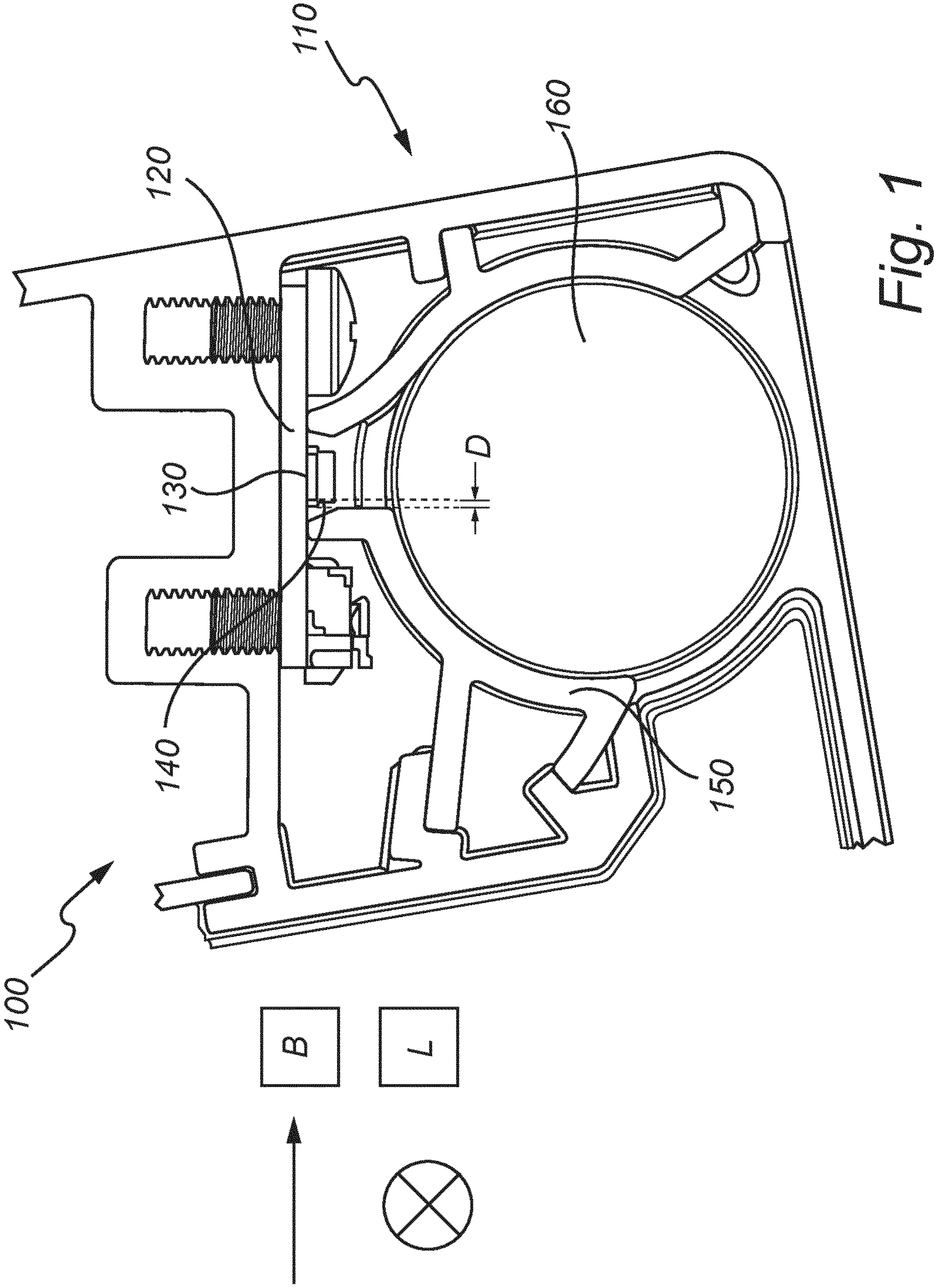
FIG. 1 schematically shows a cross-sectional view of a luminaire arrangement according to an exemplifying embodiment of the present invention, FIGS. 2*a-c* schematically shows an overview of a part of a luminaire arrangement according to an exemplifying embodiment of the present invention, FIG. 3 schematically shows a cross-sectional view of a part of a luminaire arrangement according to an exemplifying embodiment of the present invention, FIG. 4 schematically shows a cross-sectional view of a luminaire arrangement according to an exemplifying embodiment of the present invention, and FIGS. 5*a-c* schematically shows a method for assembling a luminaire arrangement according to an exemplifying embodiment of the present invention.

FIG. 1 is a schematic and cross-sectional view of a luminaire arrangement 100 according to an exemplifying embodiment of the present invention. The luminaire arrangement 100 comprises a housing 110 extending in a length direction, L, and at least one printed circuit board, PCB, 120, arranged inside the housing 110 and extending in the length direction, L. Hence, the housing 110 and the PCB(s) 120 elongate in the length direction, L. The luminaire arrangement 100 further comprises at least one light source 130 which is arranged on the PCB(s) 120 alongside at least one supporting element 140, wherein the supporting element(s) 140 is (are) arranged adjacent to the light source(s) 130. For example, the light source(s) 130 may preferably be or comprise light-emitting diodes, LED(s), but may alternatively be or comprise incandescent light source(s), fluorescent light source(s), etc. The supporting element(s) 140 may be e.g. a surface mount device, SMD, or may comprise a relatively durable material such as silicon, metal, plastic, etc. The supporting element(s) 140 is (are) preferably not fragile in regard to relatively high (strong) forces.

The luminaire arrangement 100 further comprises at least one biasing element 150 extending (elongating) in the length direction, L. The biasing element(s) 150 is (are) arranged between the supporting element(s) 140 and the housing 110, and the biasing element(s) 150 is (are) configured to be biased between the supporting element(s) 140 and the housing 110 in a direction, B, perpendicular to the length direction, L. Hence, the biasing element(s) 150 abut(s) (come(s) into contact with) the supporting element(s) 140. Furthermore, it should be noted that the direction, B, may extend anywhere in a plane perpendicular from the length direction, L.

The supporting element(s) 140 extend(s) beyond the light source(s) 130 in the direction, B, by at least a distance, D, such that the light source(s) 130 and the biasing element(s) 150 are separated by at least the distance, D. Thus, the supporting element(s) 140 may have different dimensions and therefore extend beyond the light source(s) 130 in the direction, B, by varying distances, but by at least the distance, D. The supporting element(s) 140 enable(s) avoiding physical contact between the light source(s) 160 and the biasing element(s) 150, e.g. when the luminaire arrangement 100 is being assembled.

The luminaire arrangement 100 further comprises at least one fastening element 160 extending (elongating) in the length direction, L. The fastening element(s) 160 is (are) arranged at least partially within the housing 110 and is (are) biased between the biasing element(s) 150 and the housing 110. Hence, the fastening element(s) 160 may be fully enclosed by the housing 110 or only partly enclosed. Furthermore, the fastening element(s) 160 is (are) configured to fasten the biasing element(s) 150 between the supporting element(s) 140 and the housing 110. The fastening element(s) 160 may comprise a light-affecting material, such as an optical element or system, a lens, a reflector, or the like.

Figure 2A:
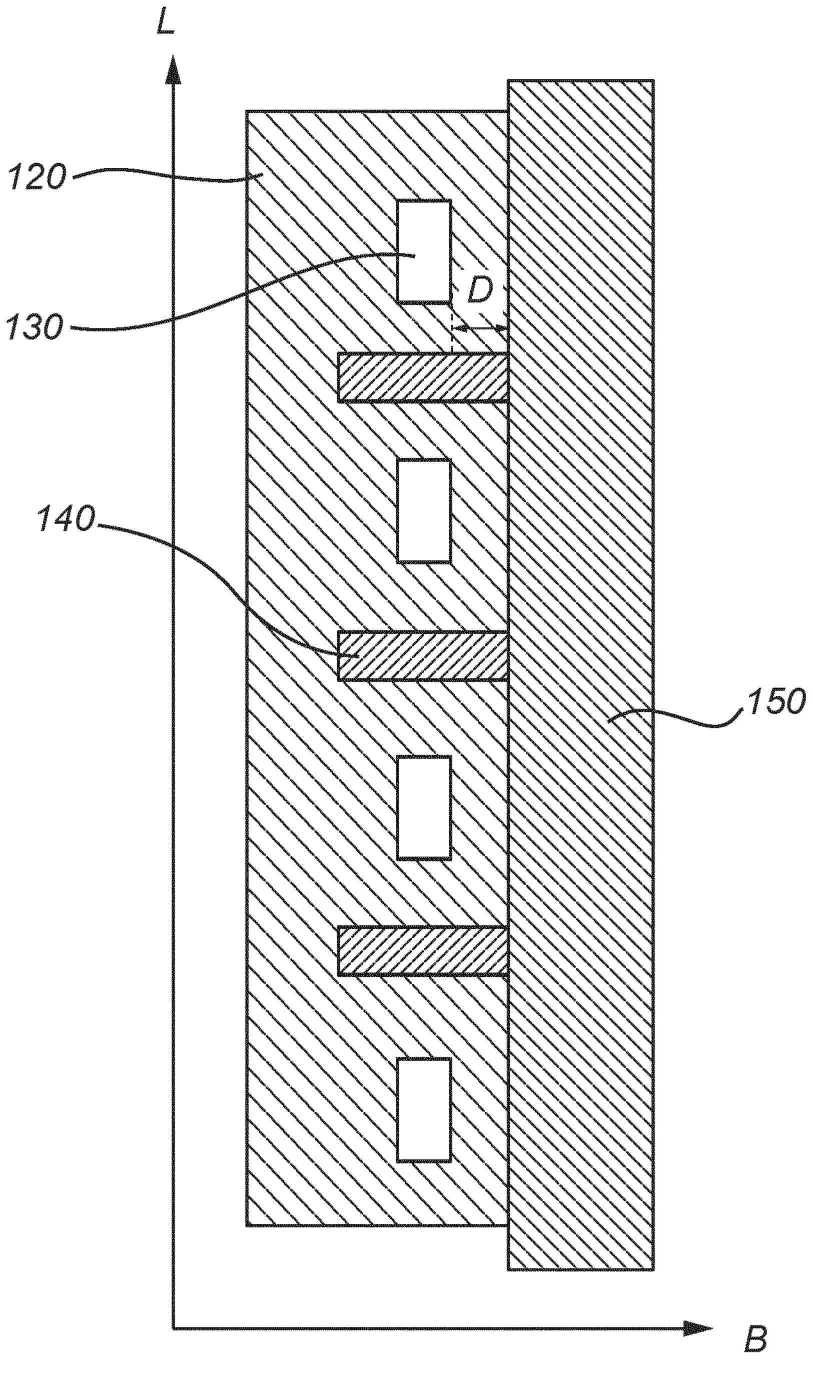
Figure 2B:
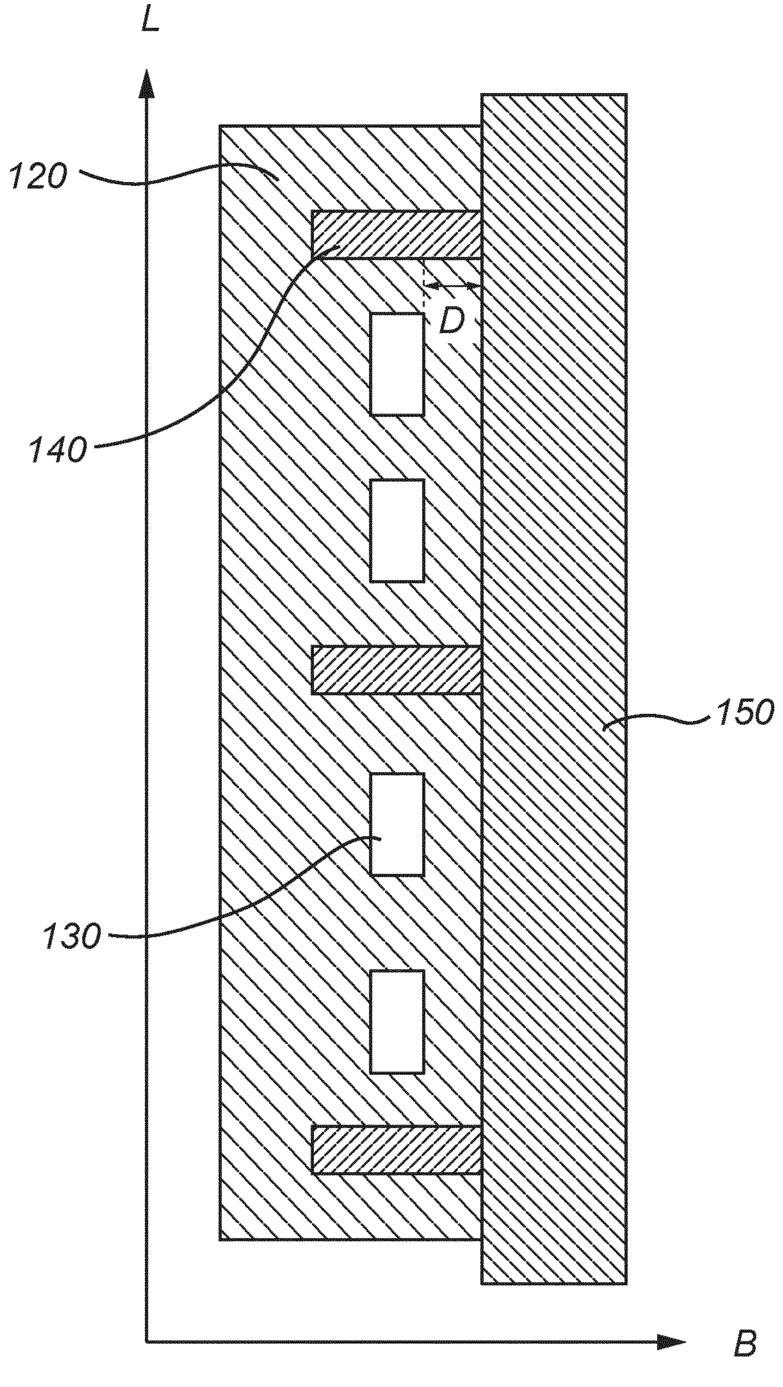
Figure 2C:
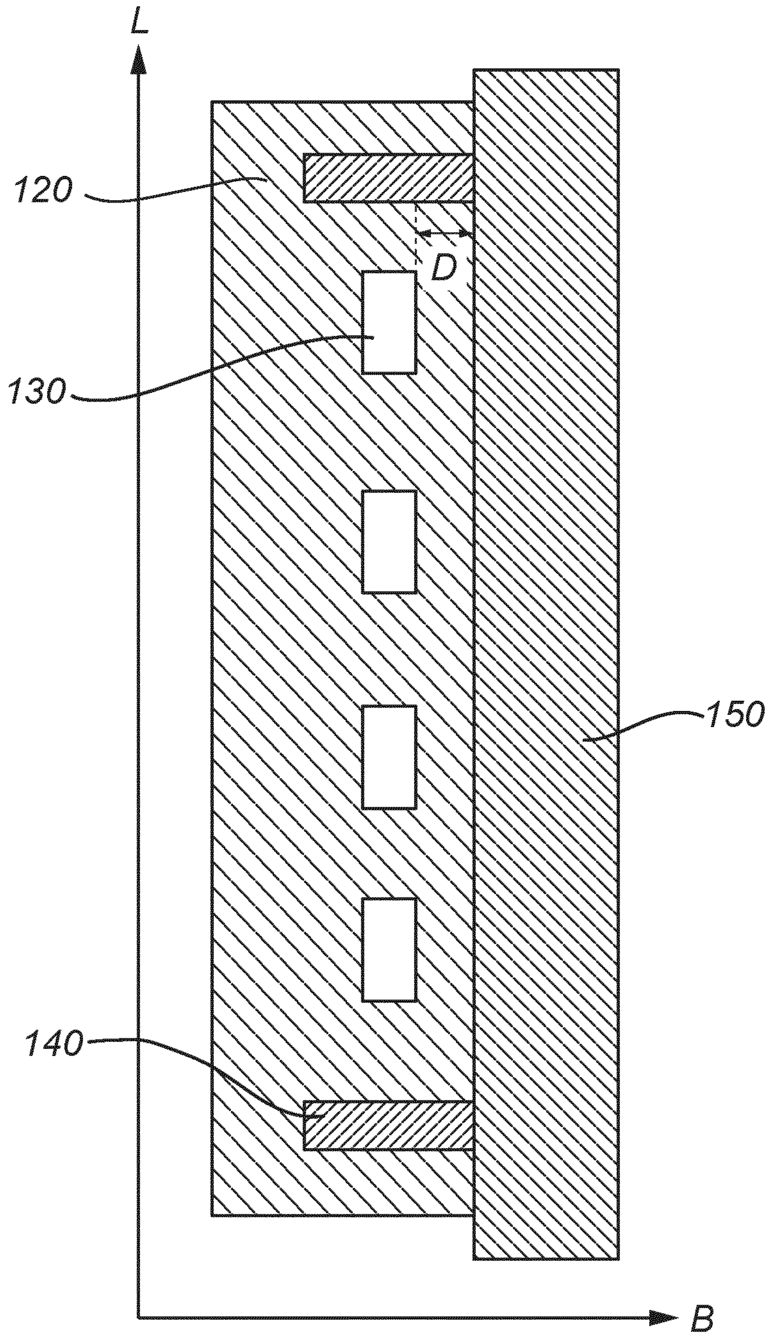

FIGS. 2*a-c* are schematic views of parts of a luminaire arrangement 100 according to exemplifying embodiments of the present invention. It should be noted that the part of a luminaire arrangement 100 shown in FIGS. 2*a-c* has several features in common with the luminaire arrangement 100 shown in FIG. 1, and it is hereby referred to FIG. 1 and the associated text for an increased understanding of some of the features and/or functions of the luminaire arrangement 100. FIGS. 2*a-c* show (a) PCB(s) 120 extending in the length direction, L. Moreover, (a) light source(s) 130 and (a) supporting element(s) 140 are arranged on the PCB(s) 120, adjacent to each other. FIGS. 2*a-c* also show (a) biasing element(s) 150 extending in the length direction, L. The biasing element(s) 150 may be configured to abut at least one of the supporting element(s) 150. Due to the biasing element(s) 150 being configured to abut at least one of the supporting element(s) 150, the supporting element(s) 150 function(s) as a protective abutment to the light source(s) 130 regarding physical contact from e.g. the biasing element(s) 150. FIGS. 2*a-c* show different positions of the light source(s) 130 and the supporting element(s) 140 on the PCB(s) 120. It should be noted that the present embodiments by no means limit the present invention to other arrangements of the light source(s) 130 and the supporting element(s) 140 on the PCB(s) 120.

In FIGS. 2*a-c*, the light source(s) 130 and the biasing element(s) 150 constitute an array, i.e. a linear configuration or arrangement, extending in the length direction, L, Thus, the luminaire arrangement 100 provides an aligned light source. It should be noted that even if the light sorce(s) 130 and the supporting element(s) 140 do not constitute an array and/or do not have the dimensions according to the present embodiments, the supporting element(s) 140 may still function as a protective abutment to the biasing element(s) 150 in order to protect the light source(s) 130. This is due to the fact that the supporting element(s) 140 may have different dimensions than depicted in FIGS. 2*a-c*. In addition to this, the supporting element(s) 140 may be arranged closer to the edge of the PCB(s) 120, facing the biasing element(s) 150, than the light source(s) 130, and therefore avoiding physical contact between the light source(s) 130 and the biasing element(s) 150.

The supporting element(s) 140 may comprises a resistor and/or a capacitor. Hence, one or more supporting elements 140 may comprise a resistor, a capacitor, or both a resistor and a capacitor. In addition to the supporting element(s) 140 comprising a resistor and/or a capacitor, the supporting element(s) 140 may comprise material(s) which may be durable in relation to applied forces on the supporting element(s) 140 from e.g. the biasing element(s) 150.

In FIG. 2*a*, the light source(s) 130 and the supporting element(s) 140 are arranged in an alternating manner on the PCB(s) 120 with a similar distance between each light source 130 and supporting element 140. This distance may vary, i.e. the arrangement of the light sources(s) 130 and the supporting element(s) 140 does not have to be symmetrical along the length direction, L, or along the direction, B, as according to the exemplied embodiment. In FIG. 2*a*, the light source(s) 130 is examplified as four light sources 130, and the supporting element(s) 140 is exemplified as three supporting elements 140, but it should be noted that the light source(s) 130 and the supporting element(s) 130 may respectively comprise substantially any number of light sources 130 and supporting elements 140.

According to exemplifying embodiments, FIG. 2*b* shows light sources 130 arranged in pairs between supporting elements 140 on the PCB(s) 120, and in FIG. 2*c*, more than two light sources 130 are arranged between supporting elements 140 on the PCB(s) 120.

Figure 3:
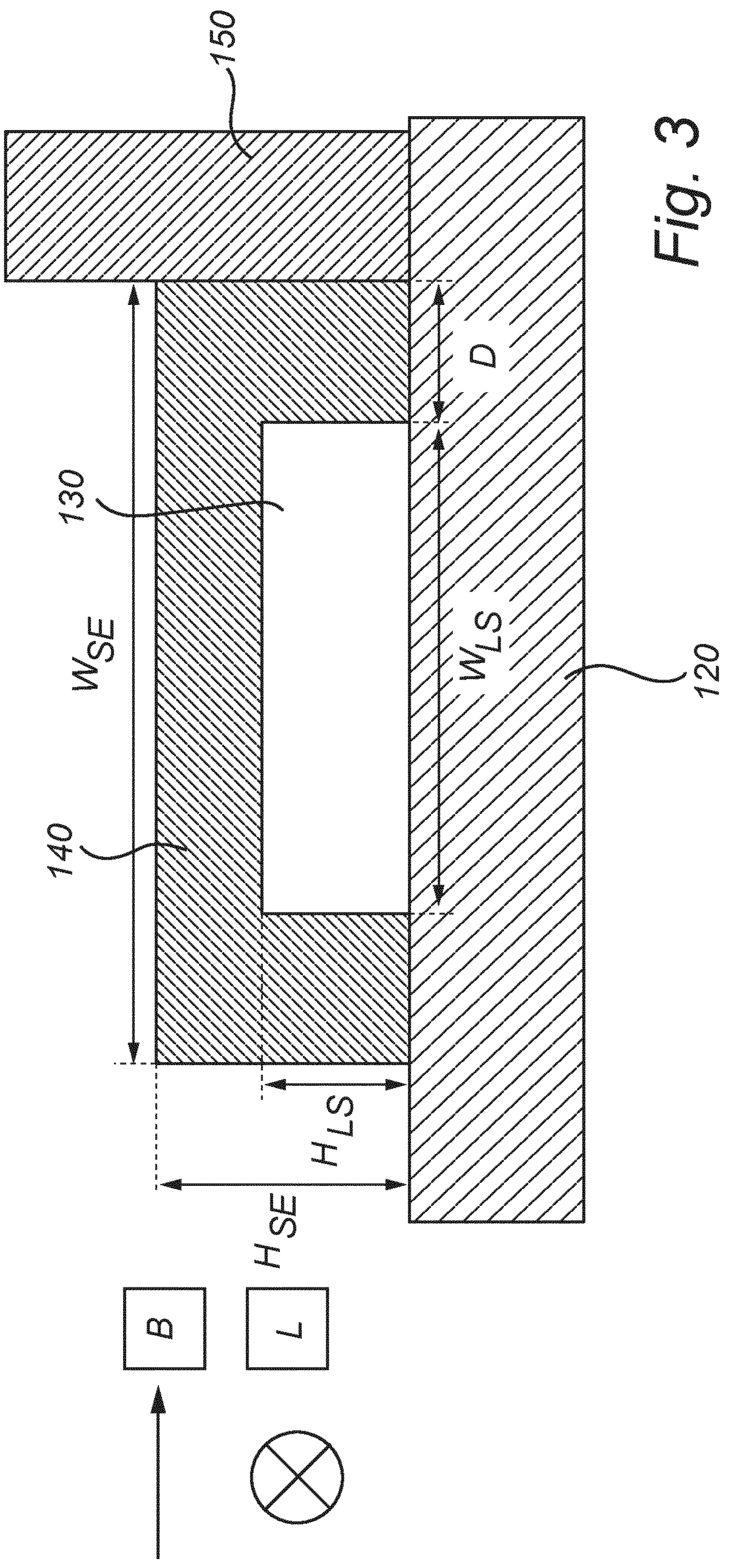

FIG. 3 shows a cross-sectional view of a segment of a luminaire arrangement 100 according to an exemplifying embodiment of the present invention. The part of the luminaire arrangement 100 comprises (a) PCB(s) 120, (a) light source(s) 130, (a) supporting element(s) 140 and (a) biasing element(s) 150. The light source(s) 130 shown in FIG. 3 has a width, $W_{LS}$, in the direction, B, and a height, $H_{LS}$, in a direction perpendicular to the length direction, L, and perpendicular to the direction, B. The supporting element(s) 140 shown in FIG. 3 has a width, $W_{SE}$, in the direction, B, and a height, $H_{SE}$, in a direction perpendicular to the length direction, L, and perpendicular to the direction, B. Furthermore, at least one of the conditions $W_{SE}>W_{LS}$ and $H_{SE}>H_{LS}$ is fulfilled. Consequentially, the supporting element(s) 140 may ensure that physical contact between the light source(s) 130 and the biasing element(s) 150 is avoided, and the supporting element(s) 140 may function as a protective abutment for the biasing element(s) 150 for protection of the light source(s) 130.

Figure 4:
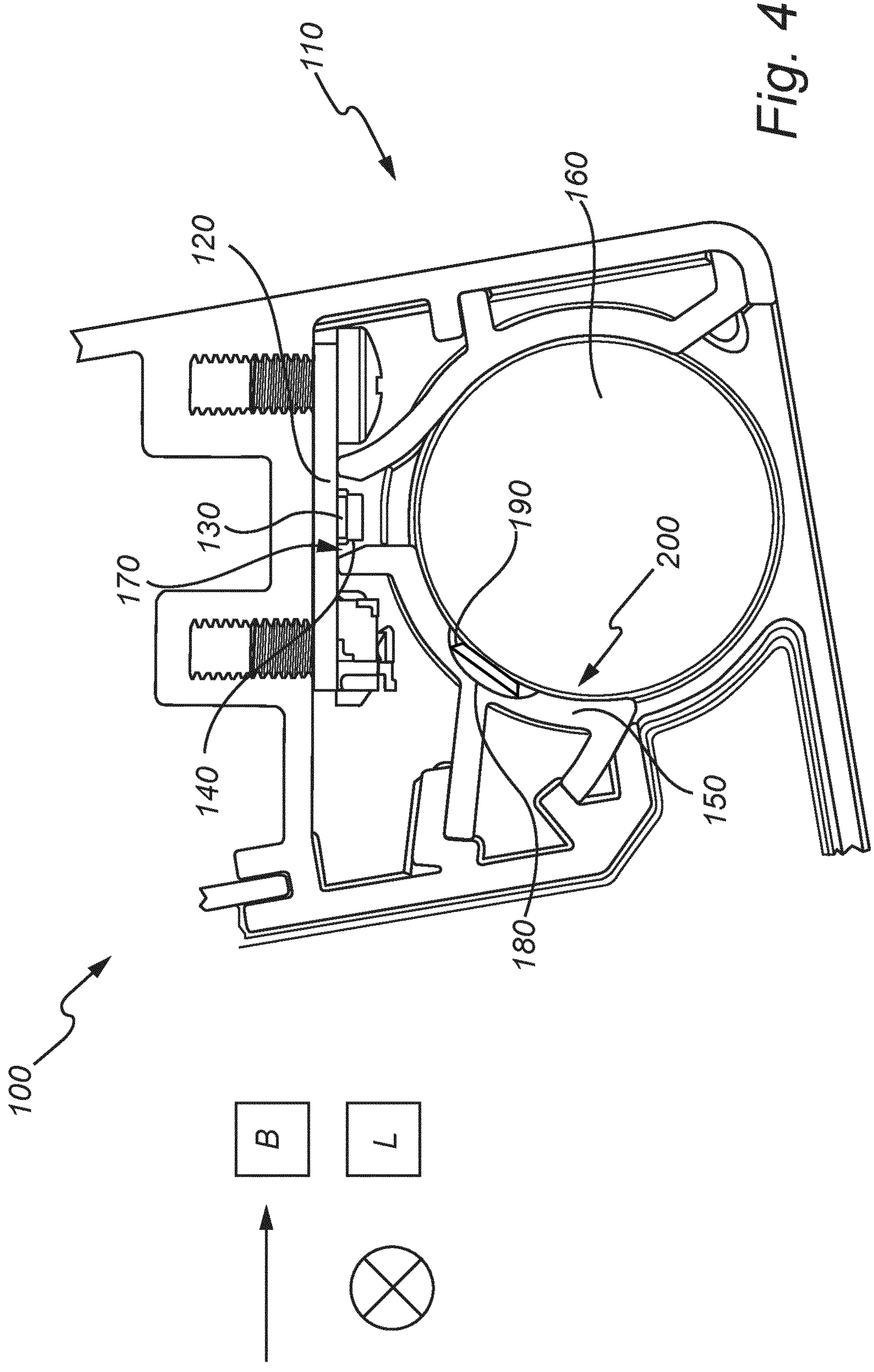

FIG. 4 shows a schematically cross-sectional view of a luminaire arrangement 100 according to an exemplifying embodiment of the present invention. It should be noted that the luminaire arrangement 100 shown in FIG. 4 has many features in common with the luminaire arrangement 100 shown in FIG. 1, and it is hereby referred to FIG. 1 and the associated text for an increased understanding of the features and/or functions of the luminaire arrangement 100. In FIG. 4, the luminaire arrangement 100 comprises (a) biasing element(s) 150 extending in the length direction, L. The biasing element(s) 150 comprise(s) a reflective surface on a side of the biasing element(s) 150 facing the fastening element 160. The reflective surface can cover the side of the biasing element(s) 150 facing the fastening element(s) 160 entirely, or only partially. The biasing element(s) 150 may thereby fully or partially reflect the beam of the light source(s) 130. The reflective surface can obtain the reflection property by comprising e.g. a reflective coating or a sheet material.

The biasing element(s) 150 is (are) further configured to be rotatably biased between the supporting element(s) 140 and the housing 110 around a rotational axis parallel to the length direction, L. The rotational movement may be made by a continuous movement, or, alternatively, in several steps to bias the biasing element(s) 150 between the supporting element(s) 140 and the housing 110. The rotational axis is arranged at a contact region 170 between the PCB(s) 120 and the supporting element(s) 140. It is to be understood that the rotational axis may be arranged in a close vicinity to the contact region 170, wherein the PCB(s) 120 and the supporting element(s) 140 connect. Hence, the biasing element(s) 150 may be rotatably biased adjacent to the supporting element(s) 140.

The housing 110 and/or the biasing element(s) 150 may be flexible. The housing 110 and/or the biasing element(s) 150 may be completely flexible, or only parts of the housing 110 and/or the biasing element(s) 150. The flexibility of the housing 110 and/or the biasing element(s) 150 may be effective e.g. during assembly of the biasing element(s) 150 and/or of the fastening element(s) 160.

The biasing element(s) 150 comprise(s) (a) recess(es) 180 and (a) foil(s) 190, wherein the foil(s) 190 is arranged in the recess(es) 180. The recess(es) 180 may for example face the fastening element(s) 160 and is (are) preferably large enough to fit the foil(s) 190 within the recess(es) 180. The foil(s) 190 may comprise a reflective material, such as aluminum (Al), silver (Ag), tin (Sn), etc.

The fastening element(s) 160 may comprise (a) optical element(s), such as a lens, a prism, an optical rod, a mirror etc. Thus, in this example, at least some of the beam of the light source(s) 130 may pass through the fastening element(s) 160. Furthermore, the optical element(s) may have an elongated cylindrical shape. Thus, the optical element(s) may extend throughout the housing 110 or only along sections of the housing 110. The cylindrical shape of the optical element(s) may have a cross section which is e.g. circular or elliptic, but also half-cylindrical or quarter-cylindrical cross-sections may be feasible. Furthermore, the biasing element(s) 150 may comprise(s) a curved surface 200 wherein the curved surface 200 is configured to abut the elongated cylindrical shape of the optical element(s). The curved surface 200 may be configured to abut the elongated cylindrical shape of the optical element(s) completely, or only to some extent.

The fastening element(s) 160, the biasing element(s) 160 and/or the housing 110 may comprise an extrusion profile. Hence, the fastening element(s) 160, the biasing element(s) 160 and/or the housing 110 may respectively have a fixed and/or uniform cross-sectional profile or outline throughout, or only parts of the fastening element(s) 160, the biasing element(s) 160 and/or the housing 110.

Figure 5A:
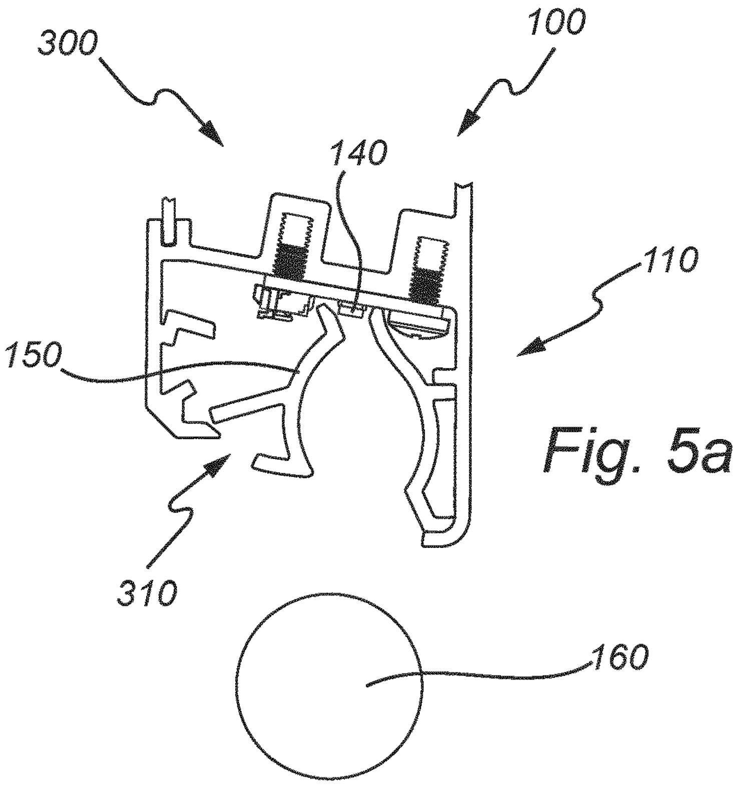
Figure 5B:
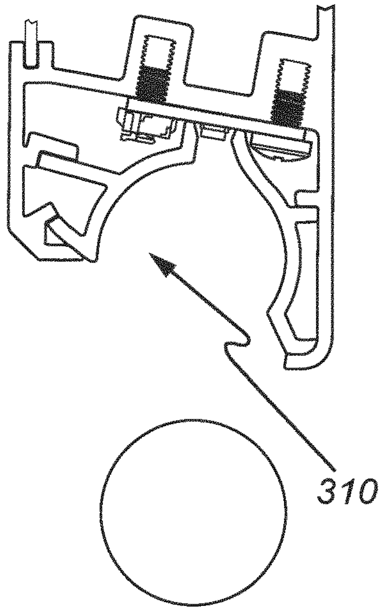
Figure 5C:
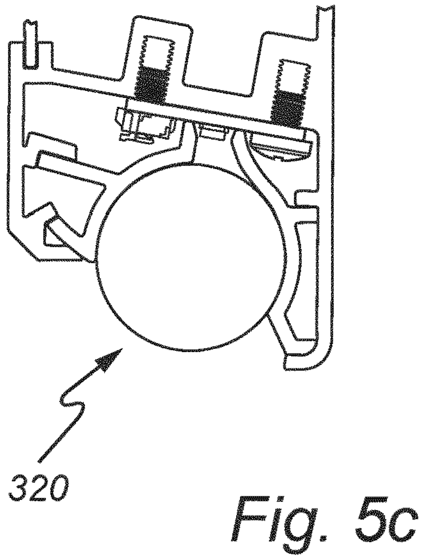

FIGS. 5*a*-*c* schematically show a method 300 for assembling a luminaire arrangement 100 according to an exemplifying embodiment of the present invention. The method 300 comprises biasingly inserting 310 a biasing element(s) 150 in the direction, B, between a supporting element(s) 140 and a housing 110. The method 300 further comprises biasingly inserting 320 a fastening element(s) 160 into the housing 110 between the biasing element(s) 150 and the housing 110, such that the biasing element(s) 150 is (are) fastened between the supporting element(s) 140 and the housing 110.

In FIGS. 5*a*-*b*, the biasing element(s) 150 is (are) biasingly inserted 310 between the supporting element(s) 140 and the housing 110. The biased insertion 310 may be performed in a continuous movement or in several steps.

In FIG. 5*c*, the fastening element(s) 160 is biasingly inserted 320 into the housing 110 between the biasing element(s) 150 and the housing 110. The person skilled in the art realizes that the present invention by no means is limited to the preferred embodiments described above. On the contrary, many modifications and variations are possible within the scope of the appended claims. For example, one or more of the supporting element(s) 140, the fastening element(s) 160, the recess(es) 180 etc., may have different shapes, dimensions and/or sizes than those depicted/described.

The invention claimed is:

1. A luminaire arrangement, comprising, a housing extending in a length direction, L, at least one printed circuit board, PCB, arranged inside the housing, wherein the at least one PCB extends in the length direction, L, at least one light source arranged on the at least one PCB, at least one supporting element arranged on the at least one PCB, and adjacent to the at least one light source, at least one biasing element extending in the length direction, L, wherein the at least one biasing element is arranged between the at least one supporting element and the housing and is configured to be biased between the at least one supporting element and the housing in a direction, B, perpendicular to the length direction, L, wherein the at least one supporting element extends beyond the at least one light source in the direction, B, by at least a distance, D, such that the at least one light source and the at least one biasing element are separated by at least the distance, D, and at least one fastening element extending in the length direction, L, wherein the at least one fastening element is arranged at least partially within the housing and is biased between the at least one biasing element and the housing, and wherein the at least one fastening element is configured to fasten the at least one biasing element between the at least one supporting element and the housing wherein the at least one fastening element comprises at least one optical element which has an elongated cylindrical shape.

2. The luminaire arrangement according to claim 1, wherein the at least one biasing element comprises a reflective surface on a side of the at least one biasing element facing the at least one fastening element.

3. The luminaire arrangement according to claim 1, wherein the at least one biasing element is configured to be rotatably biased between the at least one supporting element and the housing around a rotational axis parallel to the length direction, L.

4. The luminaire arrangement according to claim 3, wherein the rotational axis is arranged at a contact region between the at least one PCB and the at least one supporting element.

5. The luminaire arrangement according to claim 1, wherein the at least one light source has a width, $W_{LS}$, in the direction, B, and a height, $H_{LS}$, in a direction perpendicular to the length direction, L, and perpendicular to the direction, B, and wherein the at least one supporting element has a width, $W_{SE}$, in the direction, B, and a height, $H_{SE}$, in a direction perpendicular to the length direction, L, and perpendicular to the direction, B, wherein at least one of $W_{SE}>W_{LS}$, and $H_{SE}>H_{LS}$, is fulfilled.

6. The luminaire arrangement according to claim 1, wherein the at least one supporting element comprises at least one of a resistor and a capacitor.

7. The luminaire arrangement according to claim 1, wherein the at least one light source and the at least one supporting element constitute an array extending in the length direction, L.

8. The luminaire arrangement according to claim 1, wherein the luminaire arrangement comprises at least two light sources arranged on the at least one PCB and wherein the at least one supporting element is arranged between the at least two light sources.

9. The luminaire arrangement according to claim 1, wherein at least one of the housing and the at least one biasing element is flexible.

10. The luminaire arrangement according to claim 1, wherein the biasing element comprises at least one recess and at least one foil, wherein the at least one foil is arranged in the at least one recess.

11. The luminaire arrangement according to claim 1, wherein at least one of the at least one fastening element, the at least one biasing element, and the housing comprises an extrusion profile.

12. The luminaire arrangement according to claim 1, wherein the at least one biasing element comprises a curved surface and wherein the curved surface is configured to abut the elongated cylindrical shape of the at least one optical element.

13. A method for assembling a luminaire arrangement, wherein the luminaire arrangement comprises a housing extending in a length direction, L, at least one printed circuit board, PCB, arranged inside the housing, wherein the at least one PCB extends in the length direction, L, at least one light source arranged on the at least one PCB, at least one supporting element arranged on the at least one PCB, and adjacent to the at least one light source, at least one biasing element and at least one fastening element comprising an elongated, cylindrically shaped, optical element, the method comprising biasingly inserting the at least one biasing element in a direction, B, perpendicular to the length direction, L, between the at least one supporting element and the housing, wherein the inserted at least one biasing element extends in the length direction, L, and the at least one supporting element extends beyond the at least one light source in the direction, B, by at least a distance, D, such that the at least one light source and the at least one biasing element are separated by at least the distance, D, and biasingly inserting the at least one fastening element into the housing between the at least one biasing element and the housing, such that the biasing element is fastened between the at least one supporting element and the housing, wherein the inserted at least one fastening element extends in the length direction, L.

* * * * *